United States Patent [19]
Sheldon et al.

[11] 3,984,160
[45] Oct. 5, 1976

[54] ONE-PIECE REAR GREASE SEAL

[75] Inventors: Jerome F. Sheldon, Milwaukee; Donald R. MacLeod, Dousman, both of Wis.

[73] Assignee: Rexnord Inc., Milwaukee, Wis.

[22] Filed: Dec. 10, 1975

[21] Appl. No.: 639,512

[52] U.S. Cl. ................................ 308/187.1; 308/18
[51] Int. Cl.² .................................................. F16C 1/24
[58] Field of Search ................... 308/187, 187.1, 18

[56] References Cited
UNITED STATES PATENTS

| | | | |
|---|---|---|---|
| 2,757,052 | 7/1956 | Spurgeon | 308/187 |
| 3,489,471 | 1/1970 | Kelley | 308/187.1 |

Primary Examiner—M. H. Wood, Jr.
Assistant Examiner—Richard A. Bertsch
Attorney, Agent, or Firm—Sughrue, Rothwell, Mion, Zinn and Macpeak

[57] ABSTRACT

The specification describes two embodiments of a one-piece rear grease seal for an idler roller mounted on a shaft. Both embodiments comprise an annular lip in the shape of a truncated cone, an annular ring integrally connected to the larger end of the annular lip, and an annular web integrally connected to the outer end of the annular ring. In one embodiment, an annular groove is found on the annular ring to receive an axial end of an inner tube mounted concentrically about the shaft; the other embodiment does not have this feature.

10 Claims, 5 Drawing Figures

ONE-PIECE REAR GREASE SEAL

FIELD OF THE INVENTION

This invention relates to rear grease seal for idler rollers such as are used to support conveyor belts.

SUMMARY OF THE INVENTION

The invention is a one-piece rear grease seal for an idler roller mounted on a shaft. The grease seal comprises an annular lip in the shape of a truncated cone, an annular ring integrally connected to the larger end of the annular lip, and an annular web integrally connected to the outer end of the annular ring.

DESCRIPTION OF THE PRIOR ART

Figure 1:
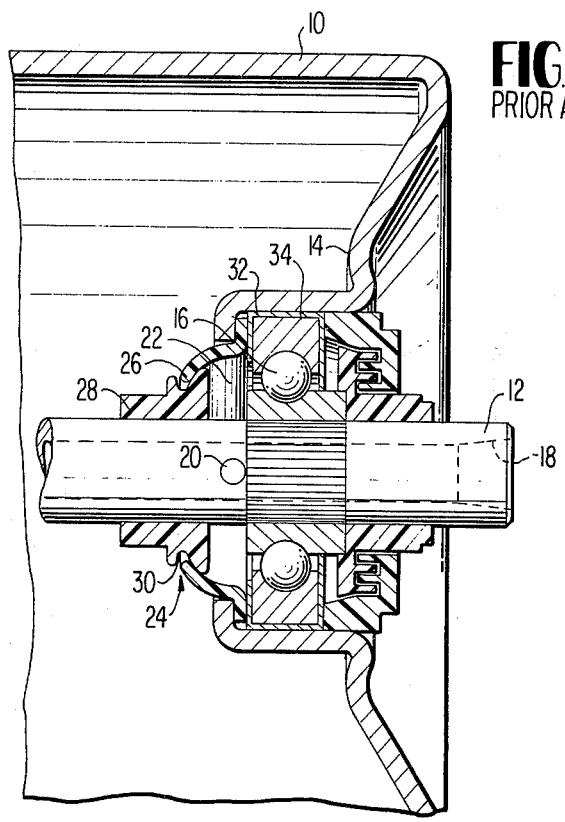
FIG. 1 is a sectional view of one end of an idler roller mounted on a shaft, showing the prior art two-piece rear grease seal.

FIG. 1 shows the two-piece rear grease seal previously used by the assignee of this invention in the environment in which it is used. The environment comprises an idler roller 10 mounted on a shaft 12. The idler roller 10 has a concave end disc 14 in which a ball bearing 16 is mounted. The bearing 16 is greased by means of an axial grease passage 18 and a radial grease hole 20 which leads from the grease passage 18 to an annular chamber 22 between the bearing 16 and the two-piece rear grease seal 24. The grease seal 24 comprises an annular web 26 in the shape of a flanged disk the bottom of which is removed and a generally cylindrical mounting bushing 28 which surrounds the shaft 12 in sealing contact with its outer surface. A groove 30 is formed on the outer surface of the bushing 28 to receive the inner end of the annular web 26, and the outer end of the annular web 26 is held between the inner end of the end disc 14 and a plastic housing 32 surrounding the outer race 34 of the bearing 16. Thus, relative rotational motion normally takes place between the inner end of the annular web 26 and the surface of the groove 30, although the bushing 28 can also rotate on the shaft 12.

DETAILED DESCRIPTIONS OF THE PRESENTLY PREFERRED EMBODIMENTS

Figure 2:
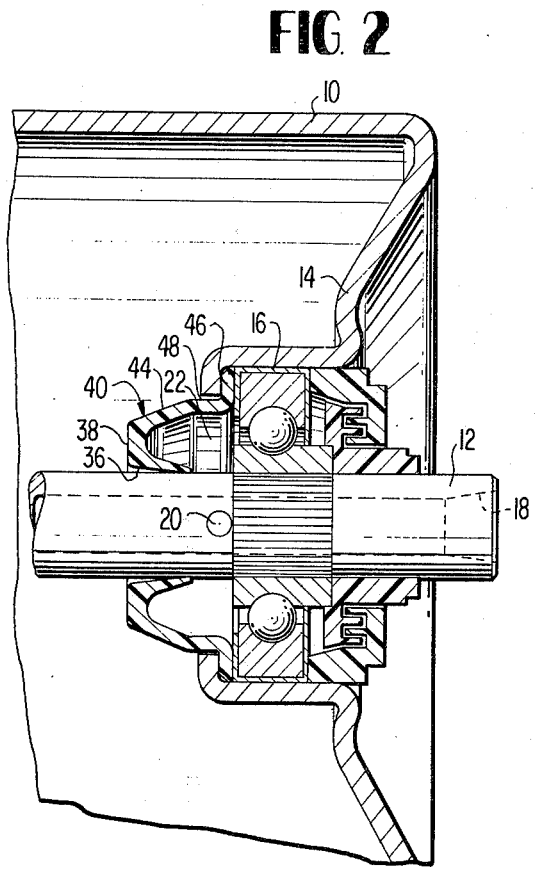
FIG. 2 is a sectional view of one end of an idler roller mounted on a shaft, showing one embodiment of the subject invention.
Figure 4:
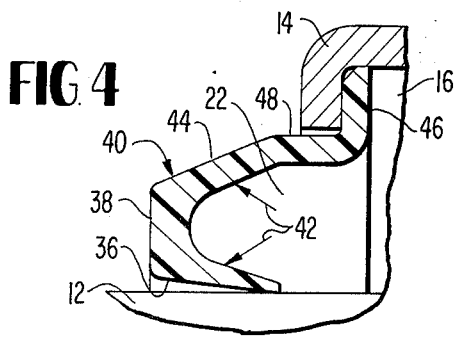
FIG. 4 is a fragmentary sectional view of a portion of the embodiment of the present invention shown in FIG. 2.
Figure 5:
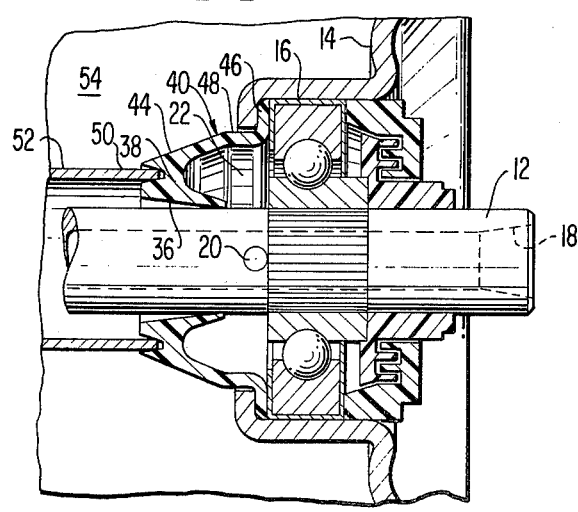
FIG. 5 is a sectional view of one end of an idler roller mounted on a shaft, showing a second embodiment of the subject invention.

The subject invention is intended to be used in exactly the same environment as its predecessor, and accordingly FIGS. 2, 4, and 5 show many of the same parts as those shown in FIG. 1. In each such case, the part bears the same number as in FIG. 1, and the description thereof will not be repeated.

Figure 3:
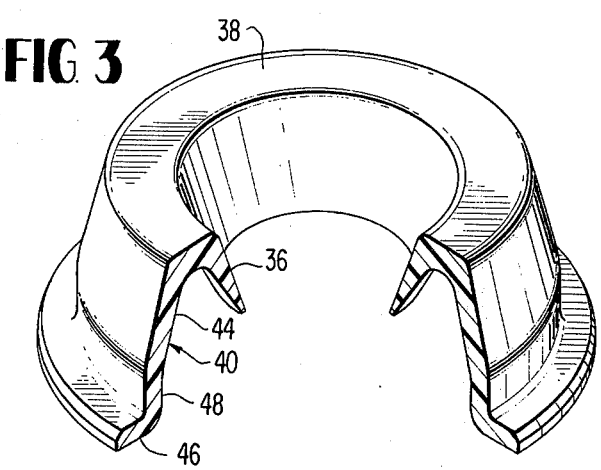
FIG. 3 is a perspective view, partly in section, of the embodiment of the present invention shown in FIG. 2.

The embodiment of the one-piece rear grease seal shown in FIGS. 2–4 comprises an annular lip 36 in the shape of a truncated cone the smaller end of which is sized to engage the shaft 12 in a light wiping contact during normal use of the seal, an annular ring, or sphincter section, 38 integrally connected to the larger end of the annular lip 36, and an annular web 40 integrally connected to the outer end of the annular ring 38. (As used herein, the expression "a light wiping contact" includes both a small amount of clearance - say up to about 0.022 inch - and a light actual contact.) The annular lip 36 is made of a material and in a thickness such that it will flex into a tight sealing contact with the shaft 12 under the pressence of a charge of grease applied to the outer surface of the seal (i.e., the surface constituting a wall of the chamber 22), and the annular ring 38 is made of a material and in a thickness such that it holds the annular lip 36 in place when a charge of grease is applied to the outer surface of the seal. The assignee of the subject invention has experimented with several commercially available plastic materials, and, of those tested, Hytrel appears to provdie the best results. The annular lip 36 is preferably tapered as shown to a "feather edge" which rides lightly on or just clears the surface of the shaft 12.

It should be noted that the cooperation of the flexing annular lip 36 and the annular ring 38 is critical to this invention, since earlier one-piece grease seals with which the assignee of this invention experimented failed when internal greasing pressure caused the part corresponding in function to the annular lip 36 to "flip out," or turn inside out, along the outer surface of the shaft. The provision of the relatively inflexible annular ring 38 and the narrow clearance between the annular ring 38 and the shaft 12 cooperatively prevent the annular lip 36 from turning inside out along the shaft 12. As is best seen in FIG. 4, the radial component of the pressure generated by a grease charge (illustrated by the arrows 42) pushes the annular lip 36 and the annular web 40 outwardly, causing the annular lip 36 to flex downwardly into a tight sealing contact with the shaft 12, and the relative rigidity of the annular ring 38 together with the narrow clearance between the annular ring 38 and the shaft 12 prevent the annular lip 36 from being turned inside out by the axial component of the pressure.

Although the annular web 40 can in theory be any shape whch permits the seal to be held in place on the shaft 12 by the insertion of the outer rim of the annular web 40 between the bearing 16 and the end disc 14, it preferably comprises a first member 44 in the shape of a truncated cone opening in the opposite direction to the annular lip 36, the smaller end of the truncated cone being integrally connected to the outer end of the annular ring, and a second member 46 in the shape of an annular ring the faces of which are perpendicular to the axis of the annular lip 36. As shown, the first member 44 and the second member 46 can be joined by a third member 48 in the shape of a cylinder, or they may be joined directly.

FIG. 5 shows a second embodiment of the subject invention. It is the same as the first embodiment except that an annular groove 50 is formed on the annular ring 38 on the side thereof remote from the smaller end of the annular lip 36 (i.e., the side opposite the chamber 22). The annular groove 50 is shaped to receive an axial end of an inner tube 52 mounted concentricaly about the shaft 12 by means of the annular groove 50 and a like annular groove on another like seal at the other end of the idler roller 10. The primary purpose of the inner tube 52 is to positively isolate the roll air volume 54 from the chamber 22. However, the inner tube 52 additionally serves to further stiffen the annular ring 38 against the previously discussed possibility of lip "flip out" during greasing operations.

CAVEAT

While the present invention has been illustrated by detailed descriptions of two preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

What is claimed is:
1. A one-piece rear grease seal for an idler roller rotatably mounted on a shaft by means of bearing assemblies, said seal comprising:
   a. an annular lip in the shape of a truncated cone the smaller end of which is sized to engage the shaft in a light wiping contact during normal use of the seal and the tapering of which provides a narrow clearance between the inside of said annular lip and the outside of the shaft during normal use of the seal, said annular lip being made of a material and in a thickness such that it will flex into a tight sealing contact with the shaft under the pressure of a charge of grease applied to the outer surface of the seal;
   b. an annular ring integrally connected to the larger end of said annular lip, said annular ring being made of a material and in a thickness such that it holds said annular lip in place when a charge of grease is applied to the outer surface of the seal; and
   c. an annular web integrally connected to the outer end of said annular ring, said annular web being shaped to permit the seal to be held in place on the shaft by the insertion of the outer rim of said annular web between a bearing assembly and an end disc of the idler roller.

2. A grease seal as recited in claim 1 wherein said annular web comprises:
   a. a first member in the shape of a truncated cone opening in the opposite direction to said annular lip, the smaller end of said first member being integrally connected to the outer end of said annular ring, and
   b. a second member in the shape of an annular ring the faces of whch are perpendicular to the axis of said annular lip.

3. A grease seal as recited in claim 2 wherein said annular lip tapers to a "feather edge" at its smaller end.

4. A grease seal as recited in claim 3 made from Hytrel.

5. A grease seal as recited in claim 2 made from Hytrel.

6. A grease seal as recited in claim 1 wherein an annular groove is formed on said annular ring on the side thereof remote from the smaller end of said annular lip, said annular groove being shaped to receive an axial end of an inner tube mounted concentrically about the shaft by means of said annular groove and a like annular groove on another like seal at the other end of the idler roller.

7. A grease seal as recited in claim 6 wherein said annular lip tapers to a "feather edge" at its smaller end.

8. A grease seal as recited in claim 7 made from Hytrel.

9. A grease seal as recited in claim 6 made from Hytrel.

10. A grease seal as recited in claim 1 made from Hytrel.

\* \* \* \* \*